United States Patent
Zdravkovic

(10) Patent No.: US 7,167,994 B2
(45) Date of Patent: Jan. 23, 2007

(54) SYSTEM AND METHOD FOR REDUCING POWER CONSUMPTION BY ESTIMATING ENGINE LOAD AND REDUCING ENGINE CLOCK SPEED

(75) Inventor: Andrej Zdravkovic, North York (CA)

(73) Assignee: ATI International, SRL (BB)

( * ) Notice: Subject to any disclaimer, the term of this patent is extended or adjusted under 35 U.S.C. 154(b) by 197 days.

(21) Appl. No.: 10/813,595

(22) Filed: Mar. 30, 2004

(65) Prior Publication Data

US 2005/0044435 A1 Feb. 24, 2005

Related U.S. Application Data

(63) Continuation of application No. 09/767,086, filed on Jan. 22, 2001, now Pat. No. 6,715,089.

(51) Int. Cl.
*G06F 1/26* (2006.01)

(52) U.S. Cl. .................. 713/322; 713/300; 713/320

(58) Field of Classification Search .......... 713/300, 713/320, 322, 501
See application file for complete search history.

(56) References Cited

U.S. PATENT DOCUMENTS

| | | | | |
|---|---|---|---|---|
| 4,670,837 A | * | 6/1987 | Sheets | 713/501 |
| 5,774,704 A | * | 6/1998 | Williams | 713/501 |
| 5,815,693 A | * | 9/1998 | McDermott et al. | 713/501 |
| 6,055,640 A | * | 4/2000 | Kageshima et al. | 713/320 |
| 6,415,388 B1 | * | 7/2002 | Browning et al. | 713/322 |
| 6,513,124 B1 | * | 1/2003 | Furuichi et al. | 713/322 |
| 6,519,706 B1 | * | 2/2003 | Ogoro | 713/322 |
| 6,633,988 B1 | * | 10/2003 | Watts et al. | 713/322 |
| 6,715,089 B1 | * | 3/2004 | Zdravkovic | 713/322 |
| 2005/0198543 A1 | * | 9/2005 | Watts et al. | 713/320 |

FOREIGN PATENT DOCUMENTS

| | | |
|---|---|---|
| EP | 0 785 498 | 7/1987 |
| EP | 0 789 292 | 8/1997 |
| WO | 00/00887 | 1/2000 |

* cited by examiner

*Primary Examiner*—Thomas Lee
*Assistant Examiner*—Malcolm Cribbs
(74) *Attorney, Agent, or Firm*—Volpe and Koenig, P.C.

(57) ABSTRACT

A computer system has at least one processor and at least one queue for storing instructions for execution by the processor. The processor is capable of being clocked at a plurality of rates. A number of instructions in the queue is measured. The optimum clock rate is selected based on in part the determined number of queued instructions.

34 Claims, 4 Drawing Sheets

SYSTEM AND METHOD FOR REDUCING POWER CONSUMPTION BY ESTIMATING ENGINE LOAD AND REDUCING ENGINE CLOCK SPEED

CROSS REFERENCE TO RELATED APPLICATION

This application is a continuation of U.S. patent application Ser. No. 09/767,086, filed Jan. 22, 2001, which issued as U.S. Pat. No. 6,715,089 on Mar. 30, 2004, and is incorporated by reference as if fully set forth.

BACKGROUND

The invention relates to power management in a computer system. More particularly, the invention relates to reducing power consumption of microprocessors in a computer system.

Reducing power consumption in computer systems is highly desirable. Reduced power consumption decreases the heat generated by the system. As the packaging of computer systems becomes more compact, the dissipation of heat generated by the system becomes problematic. Accordingly, it is desirable to reduce the generated heat by reducing power consumption. Additionally, portable or handheld computer systems usually rely on portable power supplies or batteries. Lower power consumption prolongs the usage of a single battery or power supply without a recharge.

The clock frequency of a microprocessor has a highly correlated relationship with the power consumption. A microprocessor running with a higher clock frequency consumes more power and produces more heat than the same microprocessor running with a lower clock frequency. A typical computer system fixes the clock frequency of its microprocessor at initialization. However, instead of running at the initialized clock frequency in both busy or idle modes, it is better to switch the system to a lower clock frequency if the computer is in an idle mode.

One approach to triggering a reduction in clock frequency is to monitor inputs from input devices, such as a keyboard, mouse, or trackball. If there is no input from any of the input devices, for a predetermined period of time, the system will automatically switch from a normal system clock frequency to a slower one. The clock frequency returns to normal when the system receives an input from an input device, such as a keystroke or mouse movement. The input monitoring approach has drawbacks. Although the computer is not receiving an input, it may be engaged in heavy data processing, which a reduced clock frequency hinders this heavy processing.

Another approach for triggering a reduction in clock frequency is to analyze the number of instructions executed by the microprocessor for a predetermined period of time. If the number of executed instructions is low, the clock frequency is reduced. If the number of executed instructions increases, the clock frequency is increased to normal. One drawback to analyzing past instruction execution is that the past number of instructions may not accurately reflect future processing requirements. Accordingly, it is desirable to have alternate approaches to reduce power consumption.

SUMMARY

A computer system has a processor and a queue for storing instructions for execution by the processor. The processor is capable of being clocked at a plurality of different clock frequencies. A number of instructions in the queue is measured. A particular clock frequency is selected for the microprocessor based, in part, on the determined number of queued instructions.

BRIEF DESCRIPTION OF THE DRAWING(S)

DETAILED DESCRIPTION OF THE PREFERRED EMBODIMENT(S)

Figure 1:
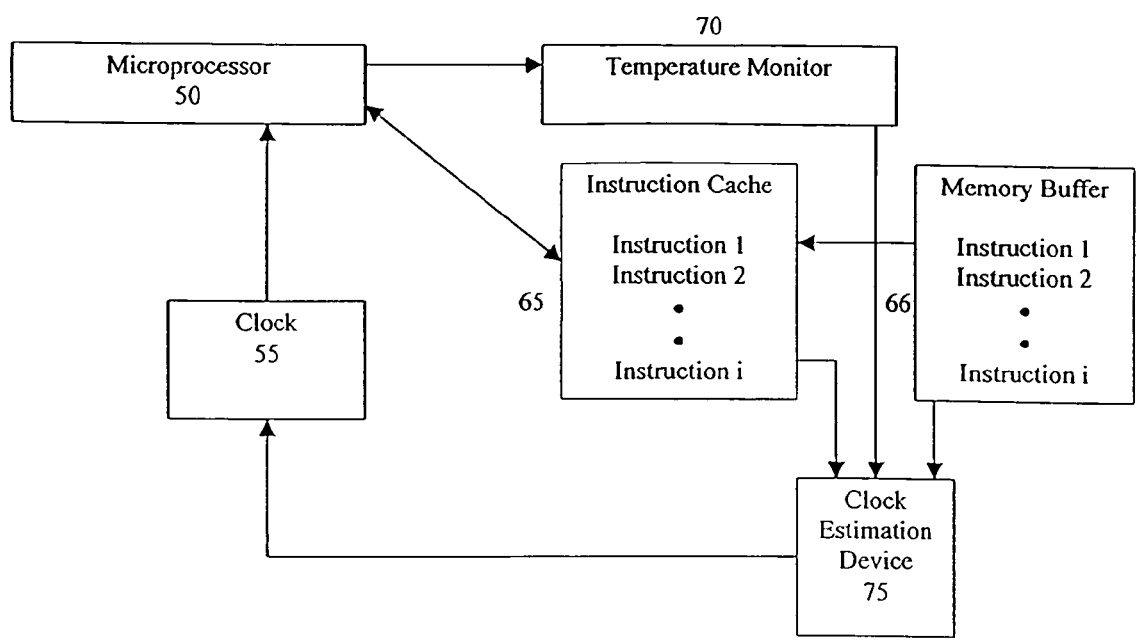
FIG. 1 is a simplified diagram illustrating the functional relationships among the microprocessor, system clock and instruction cache.

A computer system for reducing power consumption mechanism with various clock frequencies is shown in FIG. 1. The clock 55 provides a clocking signal for a microprocessor 50. The microprocessor 50 may be a central processing unit (CPU), a graphics processor, such as a D3D engine, or any other processor. The microprocessor 50 has an associated instruction cache 65. The cache 65 stores instructions for execution by the microprocessor 50. The cache 65 may be on the same chip as the microprocessor 50 or off chip. The system also has a memory buffer 66 storing instructions to be input to the instruction cache 65.

A load and estimation clock device 75 is used to control the clocking rate of the system. The estimation device 75 controls the frequency of the clock signal being input into the microprocessor 50. Based on a control signal from the estimation device 75, the clock 55 outputs the selected clocking frequency for the microprocessor among a plurality of available clock frequencies.

One approach to selecting the clock frequency is to analyze the queued instructions. Initially, the microprocessor 50 is set to run at an initialization clock frequency. All instructions waiting to be executed by the microprocessor 50 will be first queued at the memory buffer 66. The instructions queued in the memory buffer 66 are fed to the instruction cache 65 to be queued for execution by the microprocessor 50. Subsequent clock frequencies are estimated based on the number of queued instructions.

To further optimize the system's performance, the estimation device 75 analyzes the types of instructions queued. Certain instructions require more intense processing than others. To compensate for the varying intensities, each instruction is weighted based on its intensity.

Additionally, the estimation device 75 may use the measured microprocessor temperature, as determined by the temperature monitor 70, to maintain the computer system at an acceptable range of operating temperature. If the temperature of the microprocessor 50 is approaching an unacceptable level, the power consumption may need to be reduced to prevent circuit damage regardless of the backlog of instructions. To compensate for temperature, the clock estimation device 75 factors in the measured temperature.

Figure 2:
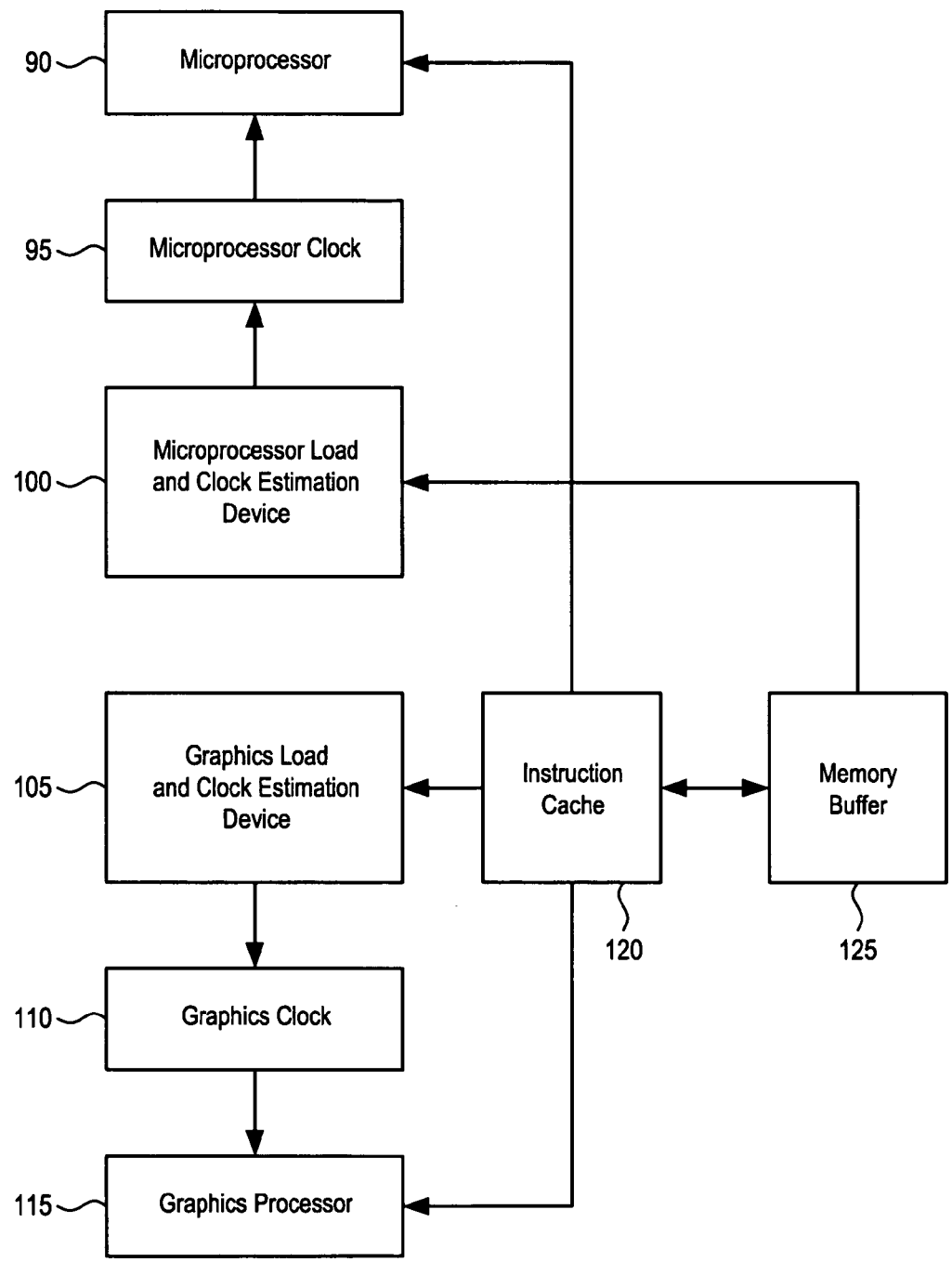
FIG. 2 is a functional block diagram of a computer system with separate reducing power consumption mechanisms for the microprocessor and the graphics processor.

FIG. 2 illustrates a computer system having separate monitoring mechanisms for a microprocessor 90 and a graphics processor 115 which process instructions queued in an instruction cache 120 and/or a memory buffer 125. The microprocessor 90 and the graphics processor 115 each have their own load and clock estimation device 100, 105, respectively. The first load and clock estimation device 100 controls the frequency of a clocking signal outputted from a first clock 95 to the microprocessor 90. The second load and clock estimation device 105 controls the frequency of a clocking signal outputted from a second clock 110 to the graphics processor 115.

One advantage to the individual monitoring of the two processors 90, 115 is that synchronization between the two estimation devices 100, 105 can be achieved. One estimation device 100, 105 can use the other device's 105, 100 information to determine its clocking frequency. One situation where this synchronization may be desirable is when one processor 90 has a larger backlog of instructions than the other 115. Although the estimation device 105 for the smaller backlog processor 115 indicates a higher clocking speed, the clocking speed may be reduced to equalize the backlog between the microprocessors 90, 115. The equalization may improve the system's performance.

Figure 3:
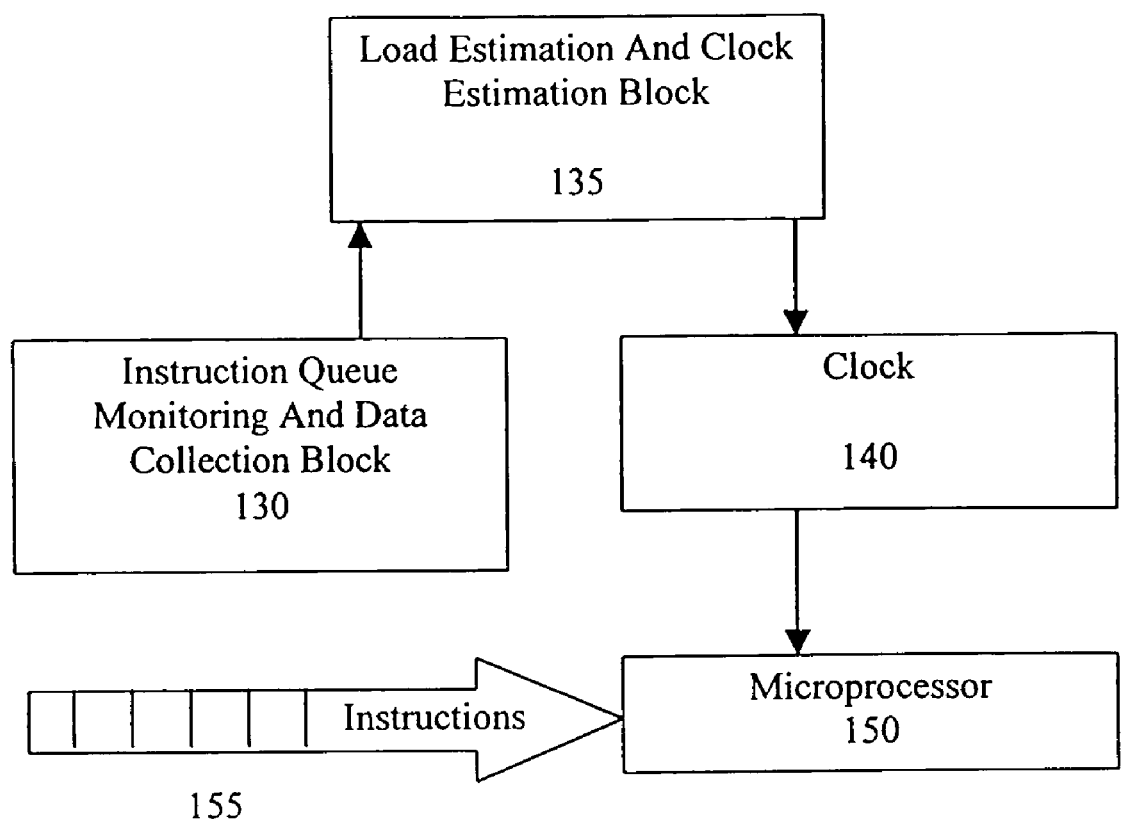
FIG. 3 is a detailed block diagram of the clock estimation device.

Another approach to estimating the clock frequency is to analyze the complexity of a set of n instructions 155, as shown in FIG. 3. Within the clock estimation device 100 or 105, an instruction queue monitoring and data collection block 130 collects information concerning the n instructions 155 which are queued in either queues 65 or 66. Based on the system design and the clock estimation algorithm latency, the set of n instructions may not be the next n instructions for execution by the microprocessor 150 in the queues 65, 66. To illustrate, the following instructions are queued for execution:

$$\ldots, I_k+n+1, I_k+n, I_k+n-1, \ldots, I_k+1, I_k, \ldots, I;$$

I is the instruction ready for execution. $I_k$ is the first queued instruction selected for analysis. According to $1_k$, the last instruction selected for analysis is $I_k+n$. The resulting latency in the queue is k−i. Based on the flexibility of the clock adjustment circuitry, the number of instructions n and algorithm latency k−i can be chosen to perform clock optimization frequently or in longer periods. A load estimation and clock estimation block 135 takes the collected data and estimates the required microprocessor performance. Based on the load estimation, a clock frequency is selected for clock 140. To reduce processing, instead of analyzing the entire instruction set, a moving average of the instruction's intensity can be taken. The moving average allows for a new load estimate every instruction cycle.

One approach to load and clock estimation uses a fuzzy logic controller. Using fuzzy logic, the n instructions are grouped into fuzzy sets, such as five sets. To illustrate, five fuzzy sets based on estimated engine load are very high load, high load, medium load, low load and very low load. The fuzzy controller outputs a fuzzy variable. After defuzzication of the fuzzy variable, the clock frequency is determined. Additional inputs may be added to the fuzzy controller, such as the current clock frequency, the processor's draw of current and the temperature. To more adaptively adjust the clock control algorithm, a neural network controller is used. The control algorithm is learned by the neural network controller.

Figure 4:
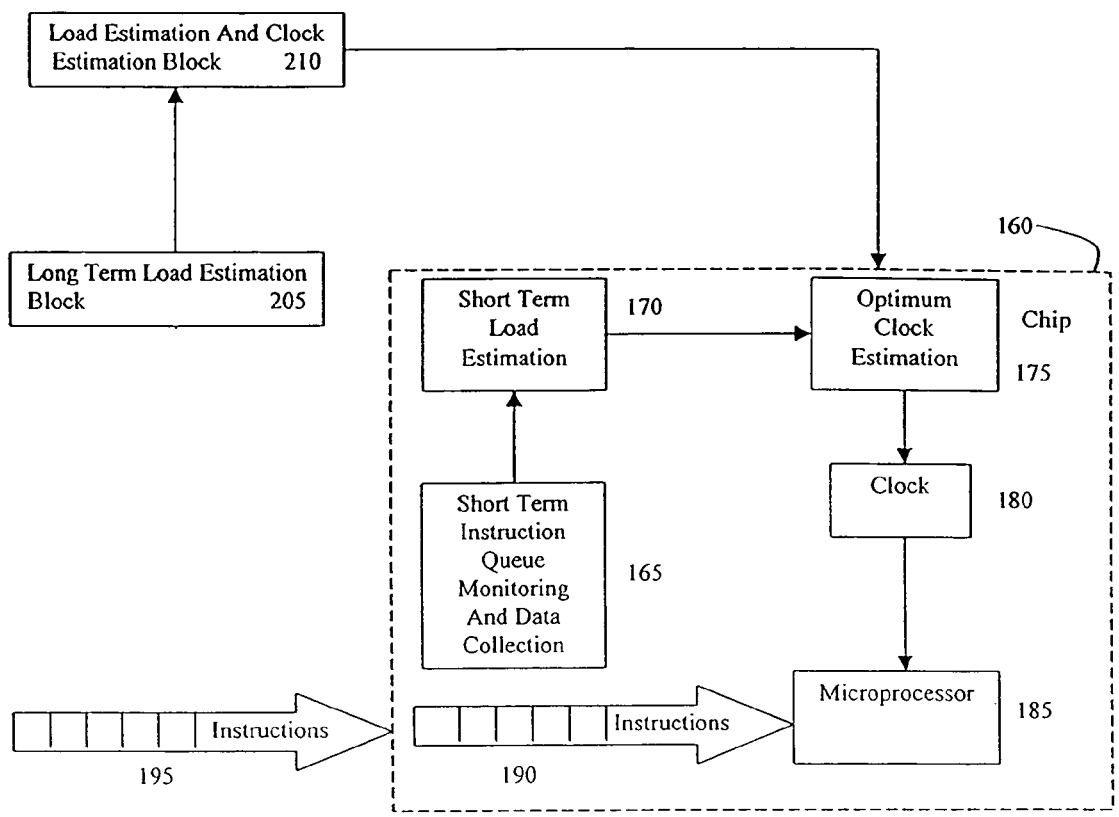
FIG. 4 is a functional block diagram of a computer system with long term and short term load estimation mechanisms.

To enhance performance, a short term and a long term estimate may be used, as shown in FIG. 4. An integrated circuit (IC) chip 160 includes a short term instruction queue monitoring and data collection device 165, a short term load estimation device 170, an optimum clock estimation device 175, a clock 180 and a microprocessor 185. The short term load estimation device 170 analyzes a set of instructions 190 stored in a cache (not shown) on the IC chip 160. Since the analysis is performed on a silicon level, the analysis is performed frequently.

Long term load estimation devices 200, 205, 210 analyze a set of instructions 195 queued off-chip, such as in an off-chip cache or in memory. Based on the long term analysis, the optimum clock estimation device 175 on the IC chip 160 determines a preferred long term clocking frequency for the clock 180. The update of the long term frequency may be performed at the same or a lower rate than the short term analysis. The optimum clock estimation device 175 also determines the clock frequency for the clock 180 based on the short term analysis and the preferred long term clocking frequency. Using this two-tier approach, short term performance can be adjusted at a fast rate.

What is claimed is:

1. A method of reducing power consumption of a system having at least one processor, the processor being coupled to at least one queue which stores instructions for execution by the processor, the method comprising:
   (a) analyzing at least one input;
   (b) estimating a load of the system based, at least in part, on the analysis of step (a) and by analyzing a plurality of types of stored instructions in the at least one queue and assigning a weight to each one of the instructions based on an intensity of processing required for each of the instructions;
   (c) determining a clock rate based, at least in part, on the estimation of step (b); and
   (d) clocking the processor at the clock rate determined in step (c).

2. The method of claim 1 wherein the input includes at least one instruction for processing by the processor.

3. The method of claim 2 wherein the at least one instruction has a predetermined weight, the predetermined weight varying according to the type of the at least one instruction.

4. The method of claim 3 wherein the estimation of step (b) changes based, at least in part, upon the predetermined weight.

5. The method of claim 2 wherein the at least one instruction is generated in response to a user input.

6. The method of claim 2 wherein the at least one instruction is generated automatically.

7. The method of claim 6 wherein the at least one instruction is generated in response to the temperature of the processor.

8. The method of claim 6 wherein the at least one queue includes a first instruction queue and a second instruction queue, and step (b) further comprises:
   (b1) using a first group of instructions queued at the first instruction queue and a second group of instructions queued at the second instruction queue as separate control factors.

9. A method of reducing power consumption of a system having at least one processor, the method comprising:
   (a) analyzing at least one input;
   (b) estimating a desired processing speed based, at least in part, on the analysis of step (a) and by analyzing a plurality of types of stored instructions in at least one queue coupled to the at least one processor and assigning a weight to each one of the instructions based on an intensity of processing required for each one of the instructions;
   (c) determining a clock rate based on the estimation of step (b); and (d) clocking the processor at the clock rate determined in step (c).

10. A method of reducing power consumption of a system having at least one processor, the method comprising:
（a) analyzing at least one input;
(b) estimating a desired processing rate based, at least in part, on the analysis of step (a) and by analyzing a plurality of types of stored instructions in at least one queue coupled to the at least one processor and assigning a weight to each one of the instructions based on an intensity of processing required for each one of the instructions;
(c) determining a clock rate based on the estimation of step (b), and
(d) clocking the processor at the clock rate determined in step (c).

11. A method of reducing power consumption of a system having at least one processor, the processor being in communication with at least one queue which stores instructions for execution, the method comprising:
controlling a clocking frequency of the processor in response to a prediction of a load of the system, the load being based, at least in part, on the instructions stored in the queue and by analyzing a plurality of types of stored instructions in the at least one queue coupled to the at least one processor and assigning a weight to each one of the instructions based on an intensity of processing required for each one of the instructions.

12. The method of claim 11 wherein the at least one queue includes a first instruction queue associated with the processor.

13. The method of claim 12 wherein the at least one queue further includes a second instruction queue associated with a second processor.

14. The method of claim 11 wherein the prediction of load of the system is based on the complexity of the instructions stored in the at least one queue.

15. The method of claim 14 wherein the prediction of the load of the system is based on the complexity of a subset of the instructions stored in the at least one queue.

16. The method of claim 11 wherein the prediction of the load of the system is based, at least in part, on a subset of the instructions.

17. The method of claim 11 wherein the prediction of the load of the system load includes a short term load prediction and a long term load prediction.

18. The method of claim 17 wherein the short term load prediction is based on instructions likely to be executed in the short term.

19. The method of claim 18 wherein the instructions likely to be executed in the short term are stored in a cache of the processor.

20. The method of claim 17 wherein the long term prediction is based on instructions likely to be executed in the long term.

21. The method of claim 20 wherein the instructions likely to be executed in the long term are stored in a cache external to said processor.

22. A computer system comprising:
(a) at least one processor;
(b) at least one queue which stores instructions for execution by the processor;
(c) a clock electrically coupled to the processor;
(d) a clock estimation device electrically coupled to the queue and the clock, the clock estimation device being configured to control a frequency of a clock signal output from the clock to the processor; and
wherein the clock estimation device analyzes a plurality of types of instructions stored in the at least one queue and assigns a weight to each one of the instructions based on an intensity of processing required for each one of the instructions.

23. The computer system of claim 22 wherein initially the processor runs at an initialization clock frequency, and subsequent clock frequencies are determined by the clock estimation device based on the number instructions stored in the queue.

24. The computer system of claim 23 wherein the subsequent clock frequencies are selected from a plurality of available clock frequencies.

25. The computer system of claim 22 wherein the processor is a microprocessor.

26. The computer system of claim 22 wherein the processor is a central processing unit (CPU).

27. The computer system of claim 22 wherein the processor is a graphics processor.

28. The computer system of claim 22 further comprising:
(e) a temperature monitor device electrically coupled to the processor and the clock estimation device for maintaining the computer system at an acceptable range of operating temperature, wherein the clock estimation device factors in a temperature measured by the temperature monitor device.

29. The computer system of claim 22 wherein the at least one queue comprises a memory buffer for queuing all instructions waiting to be executed by the processor, and an instruction cache for receiving the instructions from the memory buffer, queuing the received instructions and forwarding the instructions to the processor.

30. A computer system comprising:
(a) a first processor;
(b) a first load and clock estimation device electrically coupled to the first processor;
(c) a second processor;
(d) a second load and clock estimation device electrically coupled to the second processor;
(e) an instruction cache electrically coupled to the first and second processors and at least one of the first and second load and clock estimation devices, wherein the first and second load and clock estimation devices are synchronized;
a memory buffer electrically coupled to the instruction cache and the first load and clock estimation device for queuing all instructions waiting to be executed by at least one of the processors; and
the first and second load and clock estimation devices analyze a plurality of types of instructions stored in the memory buffer and assigns a weight to each one of the instructions based on an intensity of processing required for each one of the instructions.

31. The computer system of claim 30 further comprising:
(f) a first clock electrically coupled to the first processor and the first load and clock estimation device; and
(g) a second clock electrically coupled to the second processor and the second load and clock estimation device, wherein the first load and clock estimation device is configured to control the frequency of a first clock signal output from the first clock to the first processor, and the second load and clock estimation device is configured to control the frequency of a second clock signal output from the first clock to the first processor.

32. The computer system of claim 31 wherein when the first processor has a larger queued instruction backlog than the second processor, the frequency of the first clock signal or the second clock signal are adjusted to equalize the instruction backlog of the first and second processors.

33. The computer system of claim 31 wherein when the first processor has a smaller queued instruction backlog than the second processor, the frequency of the first clock signal or the second clock signal are adjusted to equalize the instruction backlog of the first and second processors.

34. A computer system comprising:
(a) an optimum clock estimation device;
(b) at least one long term load estimation device electrically coupled to the optimum clock estimation device;
(c) at least one short term estimation device electrically coupled to the optimum clock estimation device;
(d) a clock electrically coupled to the optimum clock estimation device; and
(e) a processor electrically coupled to the clock, wherein each of the long term and short term load estimation devices analyze a set of instructions, and the optimum clock estimation device controls the frequency of a clock signal output from the clock to the processor based on at least one of the long term and short term analysis and a weight assigned to each one of the instructions in the set of instructions based on an intensity of processing required for each one of the instructions.

* * * * *